(12) United States Patent
Willmot

(10) Patent No.: US 6,189,666 B1
(45) Date of Patent: Feb. 20, 2001

(54) RATCHET MECHANISM

(75) Inventor: Eric Paul Willmot, Melba (AU)

(73) Assignee: Aimbridge Pty Ltd (AU)

( * ) Notice: Under 35 U.S.C. 154(b), the term of this patent shall be extended for 0 days.

(21) Appl. No.: 09/367,790

(22) PCT Filed: Feb. 6, 1998

(86) PCT No.: PCT/AU98/00061

§ 371 Date: Aug. 20, 1999

§ 102(e) Date: Aug. 20, 1999

(87) PCT Pub. No.: WO98/42996

PCT Pub. Date: Oct. 1, 1998

(30) Foreign Application Priority Data

Aug. 27, 1997 (AU) .................................................. PO8822

(51) Int. Cl.⁷ .................................................. F16D 11/00
(52) U.S. Cl. .................................................. 192/46; 192/71
(58) Field of Search .................................. 192/39, 46, 71

(56) References Cited

U.S. PATENT DOCUMENTS

| | | | |
|---|---|---|---|
| 710,593 | * 10/1902 | Medley .................................. | 192/46 |
| 1,619,892 | * 3/1927 | Smith ..................................... | 192/71 |
| 1,829,006 | * 10/1931 | Kautzky .............................. | 192/46 X |
| 2,739,682 | * 3/1956 | Detwiler ................................. | 192/46 |
| 3,300,003 | * 1/1967 | Peterson et al. ....................... | 192/46 |
| 4,164,130 | * 8/1979 | Hammer ............................. | 192/46 X |
| 4,548,304 | * 10/1985 | Nagata .................................... | 192/46 |
| 4,719,769 | * 1/1988 | Pielemeier et al. ................ | 192/46 X |
| 5,597,057 | * 1/1997 | Ruth et al. ............................ | 192/46 |

FOREIGN PATENT DOCUMENTS

| | | |
|---|---|---|
| 6890/22 | of 1922 | (AU) . |
| 57164/69 | 1/1971 | (AU) . |
| 1425289 | 1/1969 | (DE) . |
| 860437 | 1/1941 | (FR) . |

OTHER PUBLICATIONS

Derwent Abstract Accession No. 88–012483/02, Class Q63, SU 1231–974 A (Kalin Fish Ind Tech) Jun. 23, 1987 Abstract and Figure.

* cited by examiner

*Primary Examiner*—Rodney H. Bonck
(74) *Attorney, Agent, or Firm*—Michael Best & Friedrich LLP

(57) ABSTRACT

A ratchet mechanism for enabling motion to be transferred in one direction but not in the opposite direction as disclosed which does not require springs. The mechanism includes an engagement member (16, 50, 100, 250, 330) which has teeth for engaging teeth on an outer member (12, 70, 200, 300). The engaging member (16, 50, 100, 250, 330) is mounted on an inner member (30, 80, 220, 320). A drive surface (120, 255, 323) on the engagement member (16, 50, 100, 250, 330) contacts teeth of the outer member (12, 70, 200, 300) when rotated in one direction so as to move the engagement member into position whereby a tooth (18, 110, 258, 335) can engage teeth of the outer member. When rotated in the opposite direction, the engagement member is moved out of engagement with the outer member to enable the ratchet to freewheel. In other arrangements, a cam (34, 321) either alone or in engagement with a drive surface causes engagement or disengagement of the teeth of the engagement member with the outer member.

13 Claims, 11 Drawing Sheets

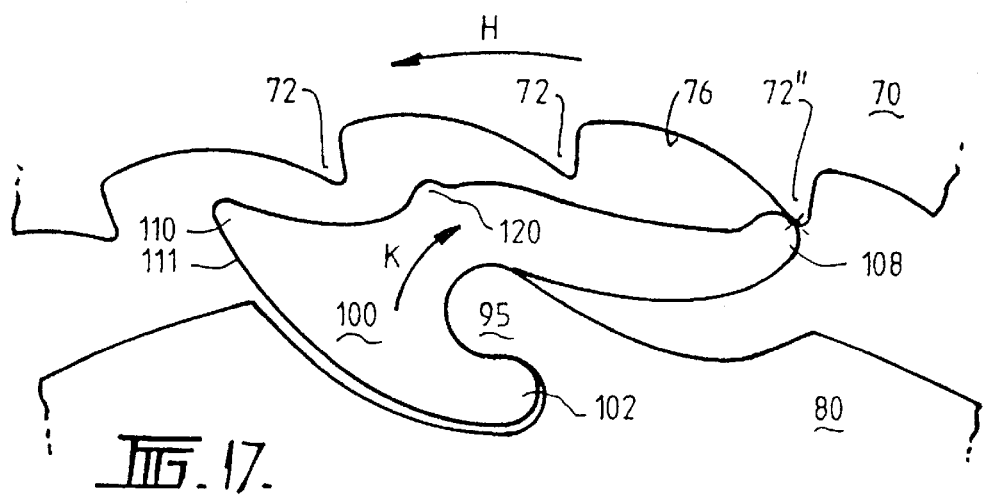
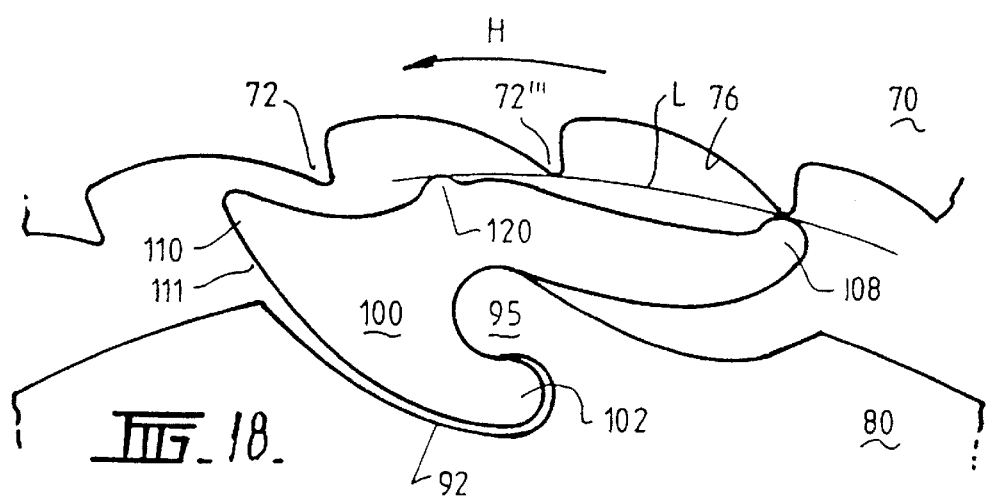
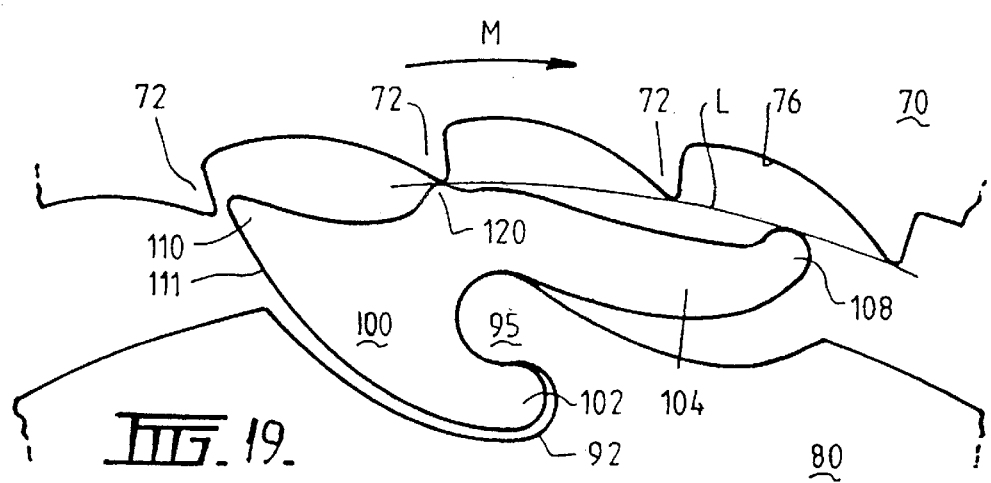

RATCHET MECHANISM

This invention relates to a ratchet mechanism for enabling motion to be transmitted in one direction but not in the opposite direction. Such mechanisms are also referred to as mechanical diodes, one way clutches and the like. The term ratchet mechanism used herein is intended to embrace such mechanisms.

Conventional ratchet mechanisms generally comprise a plurality of pawls which are spring biased radially outwardly by springs so that during rotation in one direction the pawls engage teeth to lock the mechanism and when rotated in the opposite direction, the pawls run over the teeth to allow free rotation. Whilst these mechanisms do operate adequately, they are expensive, relatively complicated to manufacture and particularly difficult to repair in some environments, particularly when used in yacht winches and, if repair is necessary, whilst the yacht is racing.

The object of this invention is to provide a ratchet mechanism which overcomes these problems.

The invention may be said to reside in a ratchet mechanism, including:
 an inner member;
 an outer member;
 at least one tooth on one of the inner or outer member;
 an engagement member on the other of the inner or outer member, the engagement member being mounted on the said other of the inner or outer member for movement relative to the said other of the inner or outer member;
 an engagement tooth on the engagement member; and
 a drive portion on the engagement member for contact by said one of the inner or outer member for moving the engagement member into position whereby the engagement tooth engages the said at least one tooth.

The ratchet mechanism of this invention need not include springs and therefore it is not necessary to locate a small spring and pawl mechanism when maintaining or repairing the ratchet mechanism. The ratchet mechanism merely requires the insertion of the engaging member in position and since this can take place without the need to locate a spring, repair and assembly is much simpler than in conventional ratchet mechanism.

Preferably the said one of the inner or outer member has a plurality of teeth, said at least one tooth being at least one of the plurality of teeth, and one of the plurality of teeth contacts the engagement member to move the engagement member so that the engagement tooth engages the at least one tooth of the plurality of teeth.

Preferably the drive portion comprises a surface of the engagement member and contact between the said one of the inner or outer member and the surface of the engagement member causes the engagement member to rock relative to the other of the inner or outer member to bring the engagement tooth of the engagement member into position whereby the engagement tooth can engage with said at least one tooth of the said one of the inner or outer member.

The surface of the engaging member providing the drive portion may be a bump on the engagement member or may be a smooth continuous portion of the surface of the engagement member.

The invention may also be said to reside in a ratchet mechanism including:
 an outer ring having at least one tooth on an inner circumference thereof;
 an engaging member having at least one tooth for engaging the at least one tooth of the outer ring, the engaging member being arranged within the outer ring;
 a drive member for moving the engaging member into engagement with the outer ring; and
 a shaft for supporting the drive member; wherein
 upon rotation of the shaft in one direction, the drive member is rotated to force the at least one tooth of the engaging member into engagement with the at least one tooth of the outer ring so that the shaft, engaging member and outer ring move as a single unitary body and upon rotation of the shaft in an opposite direction, the drive member moves the engaging member so the at least one tooth of the engaging member moves out of engagement with the at least one tooth on the outer ring so that the shaft can rotate freely relative to the outer ring.

In one embodiment, the engaging member comprises an engaging ring having a plurality of teeth on part only of its outer circumference.

In one embodiment of the invention, the drive member comprises a surface portion on the engaging ring and a cam member on the inner ring which engages in a recess in the engaging ring so that when the inner ring is rotated in said one direction, the engaging ring is rotated in the same direction by engagement of the cam in the recess and the driving surface on the ring contacts the outer ring so as to lift the engaging ring to place the teeth of the engaging ring into engagement with the at least one tooth of the outer ring.

In another embodiment, the engaging member comprises a plurality of segments arranged about the inner periphery of the outer ring, each segment having at least one tooth for engaging at least one tooth of the outer ring upon rotation of the shaft in said one direction.

In one embodiment the drive member comprises a cam disc having a cam which is fixed on the shaft and the inner ring or segment has a recess portion for receiving the cam so that upon rotation of the shaft in the first direction, the cam engages the ring or segment to force the at least one tooth of the inner ring or segment into engagement with the at least one tooth of the outer ring.

Preferably the cam includes shoulders for engaging corresponding shoulders on the inner ring or segment so that upon rotation of the shaft the shoulders on the cam abut the shoulder on the inner ring or segments to move the teeth into and out of engagement.

In another embodiment the segments have elongate slots and the cams are cylindrical projections which are received in the slots.

In one embodiment of the invention the segments are rectangular block shaped and the at least one tooth of the segment is formed by a corner apex of the block shaped segment.

In another embodiment of the invention, the engaging member is carried shaft and the drive member is a projection provided on the engaging member so that upon rotation in one direction, the at least one tooth of the outer ring engages the projection and moves the tooth of the engaging member out of engagement with the at least one tooth of the outer ring and, upon rotation in the opposite direction, the projection engages the at least one tooth of the outer ring to cause the tooth of the engaging member to engage with the at least one tooth of the outer ring so that drive is transmitted from the outer ring via the engaging member to the shaft.

In one embodiment of the invention, the inner ring is arranged generally concentrically with the outer ring. However, in an alternative embodiment, the inner ring is arranged eccentrically with respect to the outer ring.

The invention in a further aspect may be said to reside in a ratchet mechanism, including:

an outer member having a plurality of teeth on an inner circumferential surface;

an inner member having a retaining portion;

an engaging member mounted for rocking movement on the retaining portion of the inner member;

at least one tooth on the engaging member;

a drive portion on the engaging member; and wherein upon rotation of the outer ring in one direction, the teeth of the outer ring engage the drive portion of the engaging member to rock the engaging portion relative to the retaining member so that the at least one tooth of the engaging portion is disengaged from the teeth of the outer member to allow the outer member and inner member to rotate relative to one another, and upon rotation in the opposite direction, the teeth of the outer member engage the drive portion to rock the engaging member so as to cause the at least one tooth of the engaging portion to engage with at least one of the teeth of the outer ring so that the drive is transmitted from the outer ring via the engaging member to the inner member.

Preferably the retaining portion comprises an arcuate groove in the inner member and an arcuate scallop adjacent the groove which define a retaining boss on the inner member.

Preferably the engaging member has a retaining recess for engaging the retaining boss so as to locate the engaging member on the retaining boss for rotational movement with the inner member and for the rocking movement on the retaining boss relative to the inner member.

Preferably the drive portion comprises a projecting hump on the engaging portion.

Preferably the engaging portion has a tail having an abutment section for engagement with the teeth of the outer ring to facilitate rocking movement of the engaging member.

A preferred embodiment of the invention will be described, by way of example, with reference to the accompanying drawings in which:

FIGS. 8 to 22 are drawings illustrating operation of the embodiment of FIG. 7;

Figure 1:
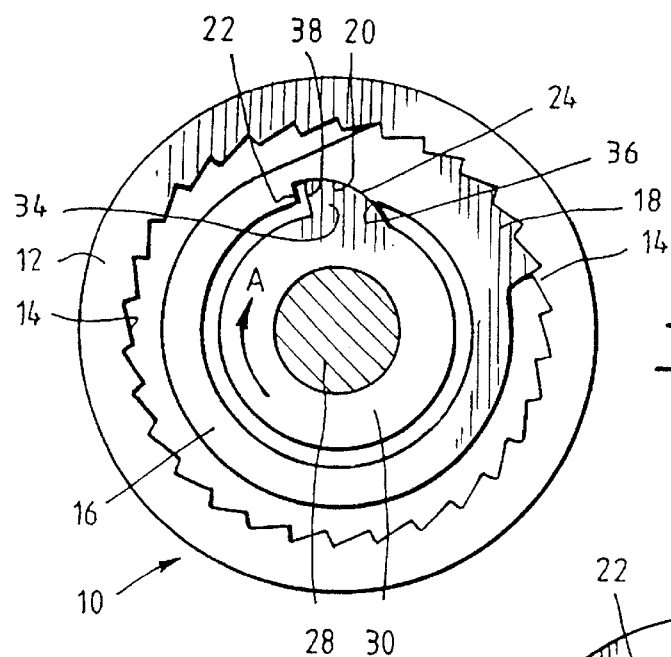
FIG. 1 is a view of a ratchet mechanism according to a first embodiment of the invention.

With reference to FIG. 1, a ratchet mechanism 10 is shown which comprises an outer ring 12 which has ratchet teeth 14 on its inner circumference. An inner ring 16 is arranged within the outer ring 12. The inner ring 16 is provided with teeth 18 on only part of its outer circumference for engagement with the teeth 14.

The ring 16 also has a recess 20 which is defined by a shoulder 22 and a curved surface 24. A shaft 28 is arranged concentrically with the inner ring 16 and outer ring 12 and carries an integral cam disc 30. The cam disc 30 is provided with a cam 34 which provides a curved cam surface 36 and a shoulder 38.

Upon rotation of the shaft 28 in the direction of arrow A in FIG. 1, the cam disc 30 is rotated so that surface 36 engages surface 24 to push the inner ring 16 generally to the right in FIG. 1 so that the teeth 18 mesh with the teeth 12. Continued rotation of the shaft 28 will therefore cause the cam 30, inner ring 16 and the outer ring 12 to rotate in the direction of arrow A as a unitary body. Thus, rotation is transmitted from the shaft 28 to the outer ring 12.

If the shaft 28 is rotated in the direction opposite to arrow A, the shoulder 38 on cam 34 engages with shoulder 22 of recess 20 to draw the ring 16 generally to the left in FIG. 1. This disengages the teeth 18 from the teeth 14 so that upon continued rotation in the direction opposite to the arrow A, the shaft 28 and the inner ring 16 rotate relative to the outer ring 12.

The ratchet mechanism described with reference to FIG. 1 has particular application in winches and like devices. In a winch application, the shaft 28 can be connected to a winch handle and the ring 12 forms part of the outer cylinder of the winch so that upon rotation in one direction, the cylinder 12 is rotated to draw in a cable and upon rotation in the opposite direction, the ring 12 is able to rotate freely relative to the handle 28. The ratchet mechanism also has application in gearing systems such as in transmission mechanism where it is required to cause a shaft and gear to rotate together in one direction but relative to one another in an opposite direction.

Figure 2:
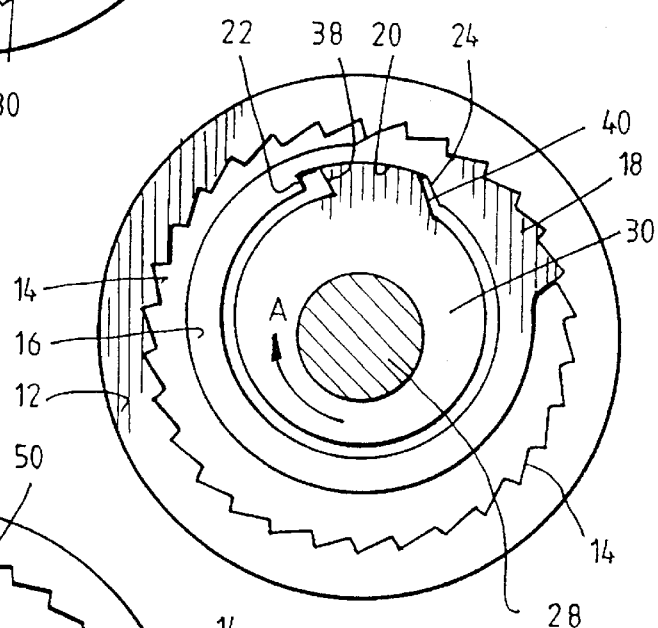
FIG. 2 is a view of the mechanism according to a second embodiment of the invention.

FIG. 2 shows a second embodiment of the invention which is similar to FIG. 1 except that the inner ring 16 is mounted eccentrically with respect to the outer ring 12.

In this embodiment of the invention, the recess 20 in the inner ring 16 has two shoulders 22 and 24. The shoulder 22 acts in exactly the same manner as the shoulder 22 in FIG. 1. The shoulder 24 in FIG. 2 replaces the curved surface 24 in FIG. 1 and because of the eccentricity of the inner ring 16 with respect to the outer ring 12, engagement of the shoulder 24 and a corresponding shoulder 40 on the cam disc 30 will cause the inner ring 16 to move so that the teeth 18 of the inner ring 16 engage with the teeth 14 of the outer ring 12. Rotation of the shaft 28 in the direction of arrow A will therefore engage the teeth 16 and 18 so that drive is transmitted to the ring 12 and rotation in the opposite direction will cause the teeth to disengage as in the earlier embodiment so that the shaft 28, cam disc 30 and ring 16 can rotate relative to the ring 12.

In other embodiments (not shown) a pair of inner rings 24 could be provided. Each ring would have teeth on part of its periphery as per the teeth 18 of FIG. 1 and FIG. 2. The two rings would be arranged 180° out of phase with respect to one another to generally distribute the load evenly across the ratchet mechanism when the teeth 18 engage the teeth 14 to transmit drive from the shaft 28 to the ring 12.

Figure 3:
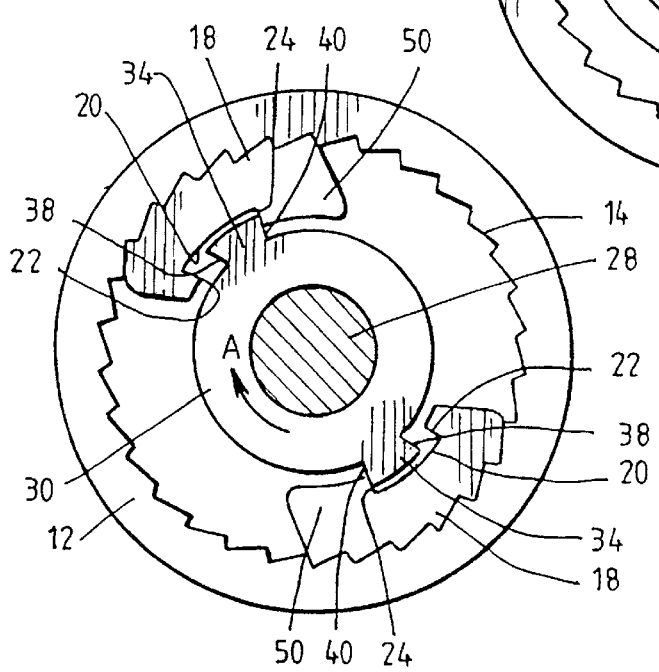
FIG. 3 is a view of a third embodiment of the invention.

With reference to FIG. 3, which shows a third embodiment of the invention, like reference numerals in this figure relate to the same parts as described with reference to the earlier embodiments.

In this embodiment of the invention, the inner ring 16 is replaced by a plurality of segments 50. In the embodiment of FIG. 3, two segments 50 are utilised however more than two segments could be used if required.

Each of the segments 50 have teeth 18 for engagement with teeth 14 of the outer ring 12. The segments 50 are provided with recesses 20 having a shoulder 38 and a shoulder 40. Cam disc 30 is provided with two cams 34 for engagement with the respective recesses 20. The cams 34 have shoulders 38 and 40.

Upon rotation of the shaft 28 in the direction of arrow A, the shoulders 40 engage the shoulders 24 of the recesses 20 to force the segments 50 generally in a clockwise direction so that the teeth 18 engage with the teeth 14 so that motion will be transmitted to the outer ring 12. The movement of the segments 50 is generally a tangential movement with respect to the cam disc 30 and outer ring 12 so that the teeth 18 are moved into engagement with the teeth 14 of the outer ring. Thus, the teeth 18 are firmly engaged with the teeth 14.

Upon rotation of the shaft 28 in a direction opposite to arrow A, the shoulders 38 engage the shoulders 22 to pull the segments 50 away from the ring 12 so that the teeth 18 disengage from the teeth 14 and the ring 12 and shaft 28 can rotate freely relative to one another.

It is preferred that when the teeth 18 are disengaged from the teeth 14, they just disengage and ride over the teeth 14 so that re-engagement of the teeth 18 with the teeth 14 upon rotation in the direction of arrow A will quickly and positively occur. This can be achieved by suitable dimensioning of the cam 34 and recess 20. Alternatively, buttons 60 could be located on the segments 50 adjacent to the cam disc 30 to limit the amount of movement of the segments 50 away from the inner ring 12. The button 60 or dimensioning of the cam 34 and recess 20 also serve to ensure that the segments 50 cannot move radially inwardly under the influence of gravity so that the teeth 18 accidentally become disengaged from the teeth 14. This is important in some applications of the ratchet and particularly so in winches for yachts where the yacht may tilt to one side thereby subjecting the segments 50 to the force of gravity which may cause them simply to drop out of engagement with the teeth 18. Dimensioning of the cam 34 and recess 20 or provision of the buttons 60 will ensure that positive engagement of the teeth 18 and 14 always is maintained until shaft 12 is rotated in the direction opposite arrow A to draw the teeth 18 out of engagement with the teeth 14.

The embodiment of FIG. 3 has the advantage that load is distributed evenly across the ratchet mechanism and is not applied to only one side of the mechanism as per the arrangement shown in FIGS. 1 and 2.

Figure 4:
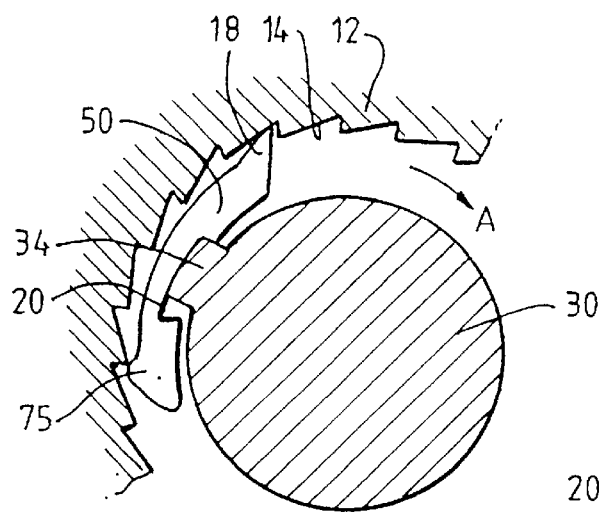
FIGS. 4 and 5 are view of a further embodiment.
Figure 5:
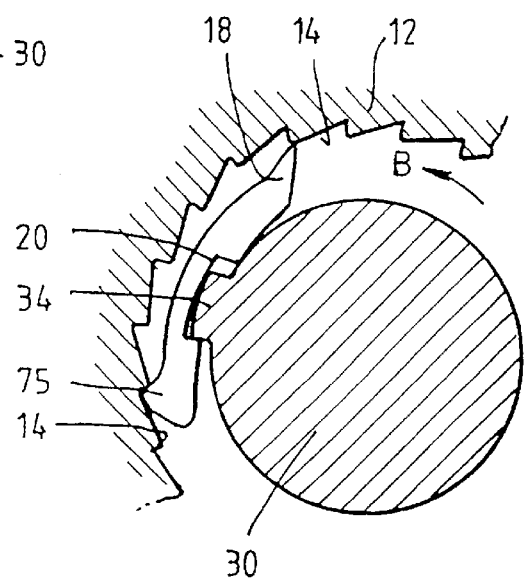

FIGS. 4 and 5 show a further embodiment of the invention. For ease of clarity, the outer ring is only partly shown and only one of the segments 50 is shown. Like reference numerals indicate like parts of those previously described.

In this embodiment of the invention, the at least one tooth 18 on the segment 50 is provided by a leading front corner of the segments 50 rather than a plurality of tooth formed on the outer surface of the segments. The segments 50 each have an outer abutment 75 which generally runs along the teeth 14 of the outer ring 12. Upon rotation of the disc 30 in the direction of arrow A, the leading edge of the segment 50 which forms tooth 18 is driven into engagement with one of the teeth 14 of the outer ring 12 in the same manner as described in the earlier embodiments.

As best shown in FIG. 5, to disengage the tooth 18 from the teeth 14, rotation of the cam disc 30 in the direction of arrow B will cause the abutment surface 75 to ride over the teeth 14 and therefore for the segment 50 to rock inwardly and outwardly so that the tooth 18 is disengaged from the teeth 14 to allow the ring 12 and the cam disc 30 together with shaft 28 (not shown) to rotate relative to the outer ring 12.

Figure 6:
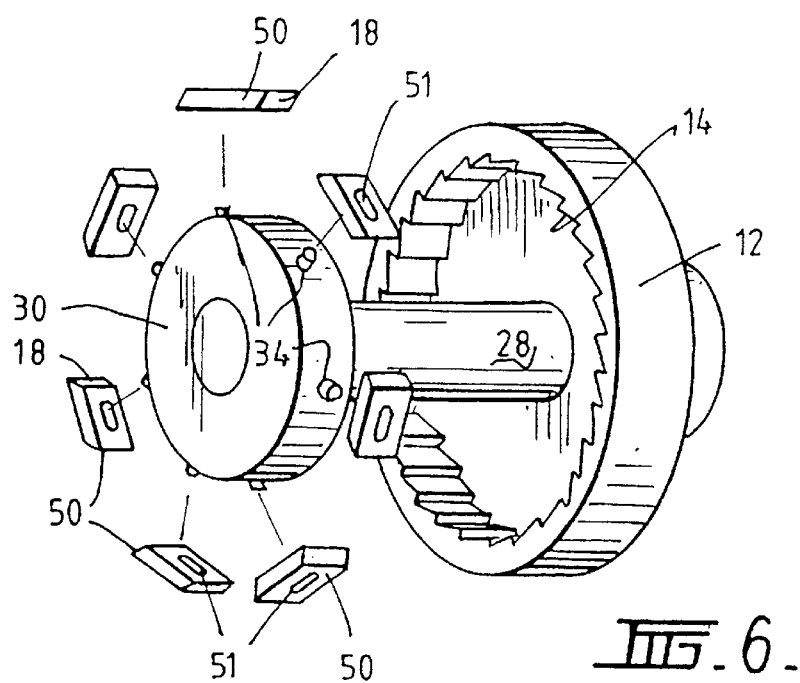
FIG. 6 is a view of yet another embodiment.

FIG. 6 shows yet a further embodiment of the invention. In this embodiment, a larger number of segments 50 are utilised. In the embodiment shown, seven segments are utilised and the segments 70 are in the form of generally rectangular blocks which have a corner apex which forms the tooth 18 for engagement with the teeth 14. The disc 30 is provided with cams 34 which are in the form of generally cylindrical protrusions and the segments 50 are each provided with generally elongate slots 51 for receiving the cylindrical cams 34. Upon rotation in one direction, the cams 34 generally push the segments 50 radially with respect to the cam ring 30 and the ring 12 as previously described so that the teeth 18 engage with one of the teeth 14 to thereby lock the disc 30 together with shaft 28 to the outer ring 12. If the shaft 28 is rotated in the opposite direction, the cams 34 move slightly in the slots 51 to draw the segments 50, and teeth 18 away from the teeth 14 so that the shaft 28 and disc 30 can rotate freely relative to the ring 12.

Since the preferred embodiments of this invention do not use springs to bias pawl members into engagement with ratchet teeth as in the conventional design, the ratchets in this embodiment are quieter than conventional designs and generally will not have the clicking noise associated with ratchet mechanisms when the ratchet is running freely (that is, in the unlocked condition). If it is desired to create the clicking noise associated with ratchet mechanisms of conventional design, a spring (not shown) could be incorporated to generally push the segments 50 or inner ring 16 outwardly towards the teeth 14 of the outer ring so that when the shaft is rotated in the direction of arrow B, the tooth or teeth 18 will positively ride over the teeth 14 to provide a clicking noise. It should be understood that the spring is not required for operation of the ratchet mechanism and is merely included to provide the clicking noise in case it is desired to clearly provide an indication that the ratchet mechanism is operating.

The ratchet mechanism according to the preferred embodiment of the invention has the advantage that it is formed from few components and can be easily assembled with respect to one another by simply locating the inner ring 16 within the outer ring and the shaft 28 and cam disc 30 within the inner ring. Spring biasing of ratchet teeth on one member to cause the teeth to engage with teeth on the other member, as in prior art designs, is not required thereby greatly simplifying construction and assembly.

FIGS. 7 to 22 show a further embodiment of the invention. In this embodiment, an outer ring 70 has a plurality of teeth 72 on its inner circumferential surface 73. The teeth 72 are defined by an apex or inwardly projecting portion 74 and a curved transition surface 76 which extends from base portion 77 of one tooth to the tip 78 of an adjacent tooth.

An inner member 80 is arranged within the outer ring 70. In one embodiment of the invention, the ratchet of FIG. 7 may be used in a winch in which the outer ring 70 is connected to the output of a gearbox of the winch and the inner ring 80 is connected to a winch drum and forms effectively an output shaft for supply of output rotary power. As will be evident from the following description, rotation of the ring 70 in one direction enables the ring 70 to freewheel relative to the inner member 80 and rotation in the opposite direction transmits drive from the ring 70 to the inner member 80.

The inner member 80 has at least one retaining member 90. The retaining member 90 is defined by an arcuate slot 92 which extends from outer surface 93 of the inner member 80 inwardly of the inner member 80. Adjacent the arcuate slot 92 is a scallop 94 in the outer surface 93. A retaining boss 95 of part circular configuration is defined between the scallop 94 and the groove 92.

An engaging member 100 is mounted on the retaining boss 95. The engaging member 100 has an arcuate arm 102 which is received within the slot 95 and a tail 104 which generally conforms in profile to the scallop 94. A part circular recess 106 is defined between the arm 102 and tail 104 and is received on the retaining boss 95 by sliding the engaging member 100 sideways onto the retaining boss 95 so that the engaging member 100 is effectively secured on and retained on the retaining boss 95 for rotation with the inner member 80, for example, in the direction of arrow G in FIG. 7 and also for rocking movement in the direction of double headed arrows F in FIG. 7 on the retaining bosses 95 (as will be explained in more detail hereinafter).

The tail 94 carries an abutment end portion 108 and the engagement member 100 has a tooth 110 extending in a direction generally opposite the arm 102. The tooth 110 is formed by a curved surface 111 which merges into the arm 110 and an opposite curved surface 113 which define a tooth apex 114 therebetween.

The tail 104 has an outer surface 115 and an inner surface 116 which generally lies on the scallop 94. Arranged between the surfaces 113 and 115 is a projecting drive member 120 which is formed as a hump or projection, which in turn forms a transition between the surface 113 and surface 115.

Figure 9:
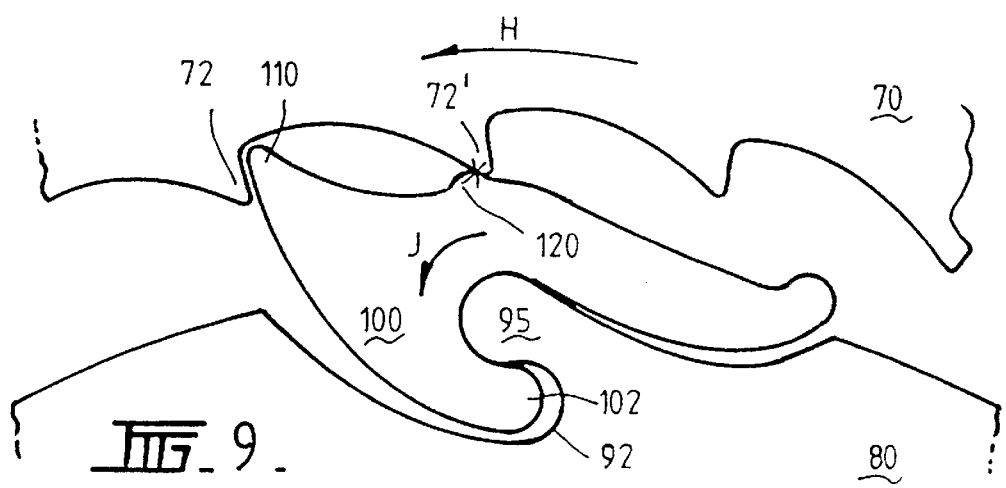
Figure 10:
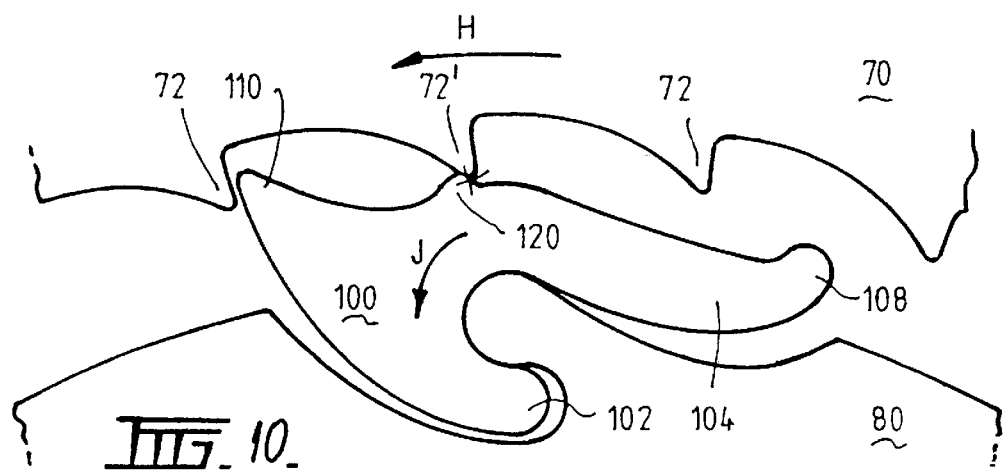
Figure 11:
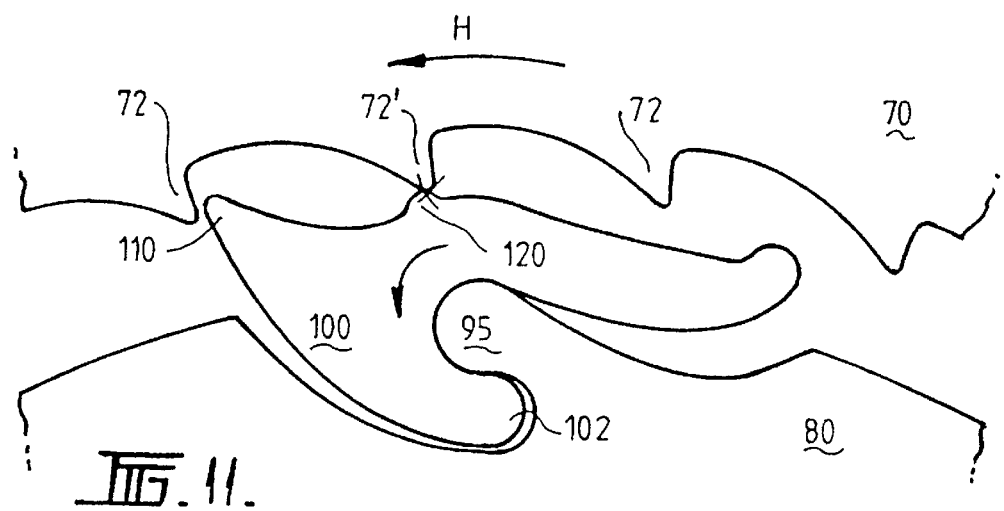
Figure 12:
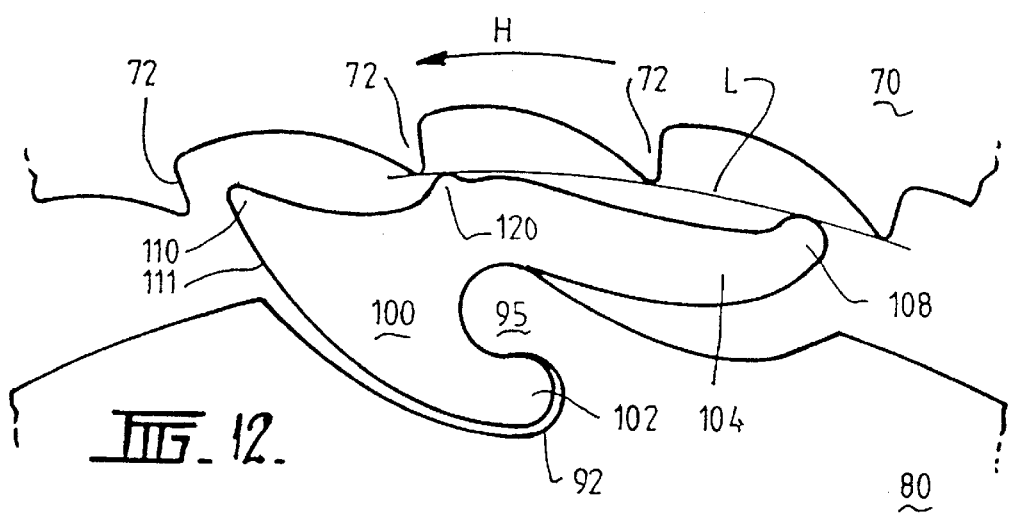

With reference to FIGS. 8 to 22, operation of the ratchet mechanism will be described in more detail. When drive was last transmitted from the ring 70 to the inner member 80, tooth surface 121 of tooth 72 between apex 78 and base 77 would have engaged surface 111 of the tooth 110 of the engagement member 100. When the outer ring 70 is rotated in the direction of arrow H, surface 121 moves away from tooth 110 as is shown in FIG. 9 and the next adjacent tooth labelled 72' in FIG. 9 engages drive projection 120 on engaging member 100. Engagement of the tooth 72' with the drive projection 120 causes the engagement member 100 to rock relative to boss 95 in the direction of arrow J in FIG. 9. This rocking movement as is shown in FIGS. 10, 11 and 12 causes the tooth 110 of the engaging member 100 to disengage completely from tooth 72 of the outer ring 70 so the teeth 72 can effectively ride over the engagement member 100 without transmitting any drive to the engagement member 100 and therefore to the inner member 80. FIGS. 9 to 11 show the arm 102 moving further into slot 92 as the engaging member 100 rocks on boss 95 in the direction of arrow J and FIG. 12 shows the engaging member 100 completely clear of the teeth 72 of the outer ring 70.

Figure 13:
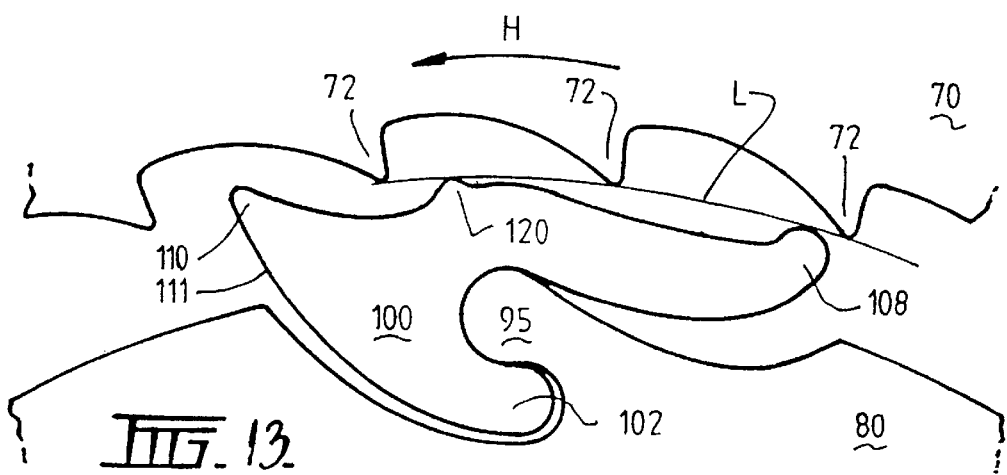
Figure 14:
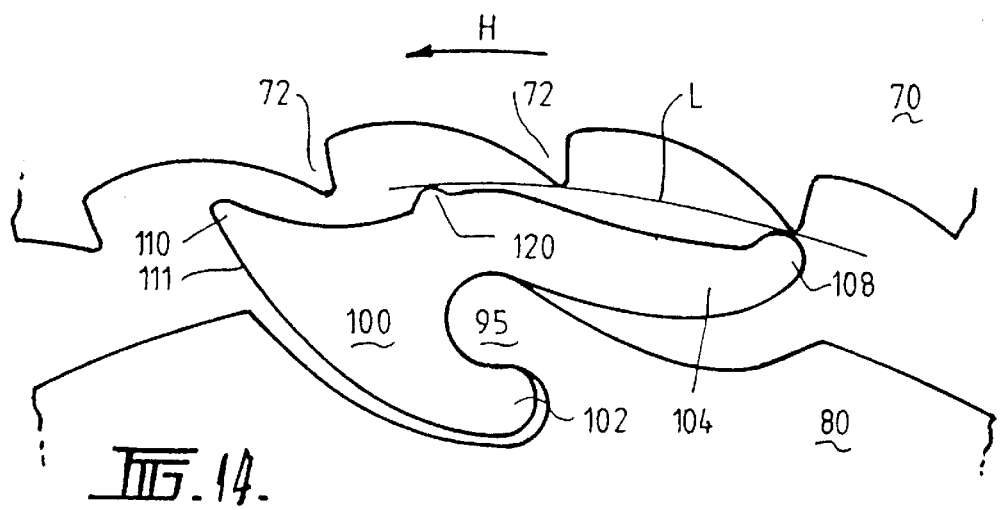

As is shown clearly in FIGS. 12, 13 and 14, continued rotation of the outer ring 70 in the direction of arrow H clears the engaging member 100 as shown by line L in those figures with the teeth 72 riding just over the drive projection 120 and abutment 108 on the tail 104.

Figure 15:
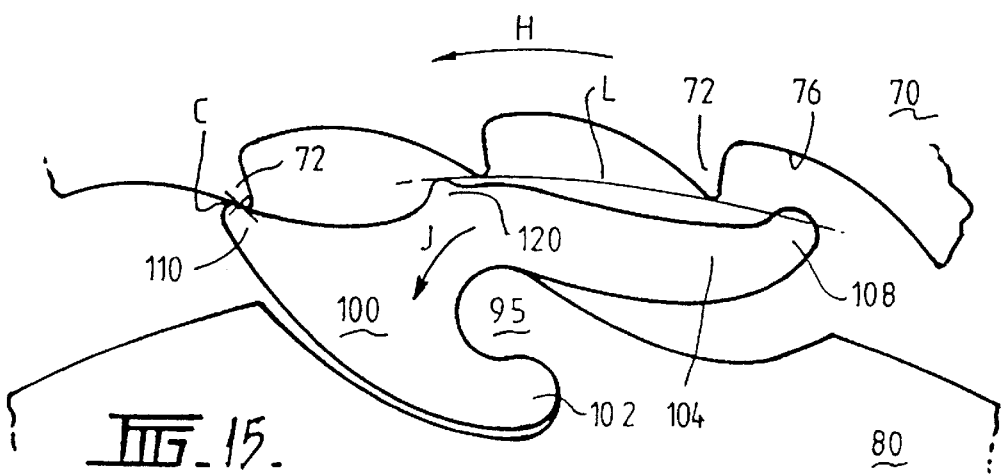
Figure 16:
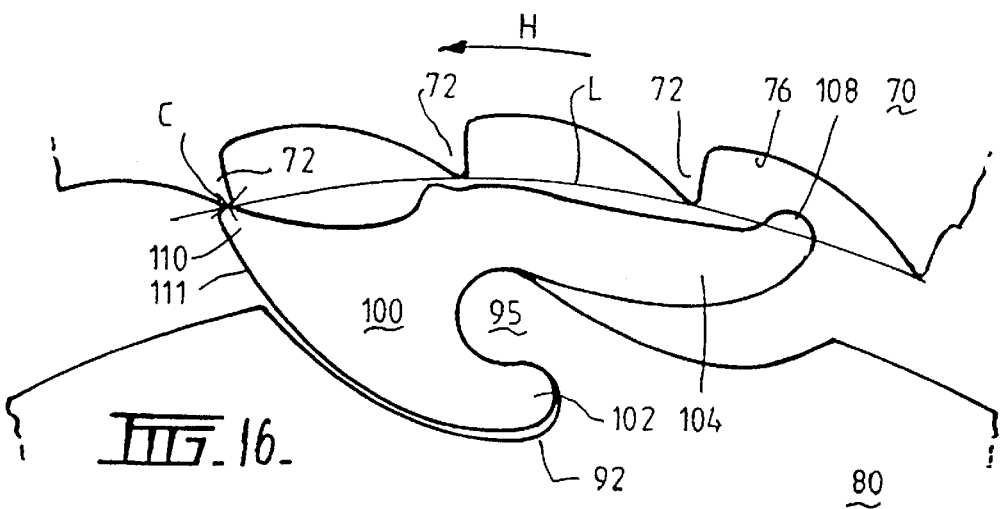

As shown in FIG. 15, as the tooth 72 of the ring 70, which has just ridden over drive projection 120, arrives at the tooth 110 of the engaging member 100 contact occurs at point C as shown in FIG. 15 which merely rocks or pivots the member 100 on boss 95 again in the direction of arrow J so that the tail 104 rides upwardly with the abutment portion 108 actually moving into the space defined by the teeth 72 and the surface 76 as is shown in FIGS. 15 and 16. Continued rotation in the direction of arrow H, as is shown in FIG. 17, will cause tooth 72" in FIG. 17 to contact abutment portion 108 of the tail 104 to rock the engagement member 100 in the direction of arrow K in FIG. 10 so that the tooth 72" can ride over the tail 104 without imparting any drive to the engagement member 100. The rocking movement continues as is shown in FIG. 18. Continued rotation of the ring 70 in the direction of arrow H as shown in FIG. 18 will cause tooth 72'" to again contact drive projection 120 so that the rocking motion of the engagement member 100 continues as described with reference to FIGS. 9 to 17. Thus, as the outer ring 70 is rotated in the direction of arrow H, the engagement member 100 is merely caused to rock back and forward on retaining boss 95 without any drive being imparted to the engagement member 100 which would in turn impart drive to the inner member 80. Thus, the outer ring 70 is effectively able to freewheel relative to the inner ring 80 without transmitting drive.

Figure 20:
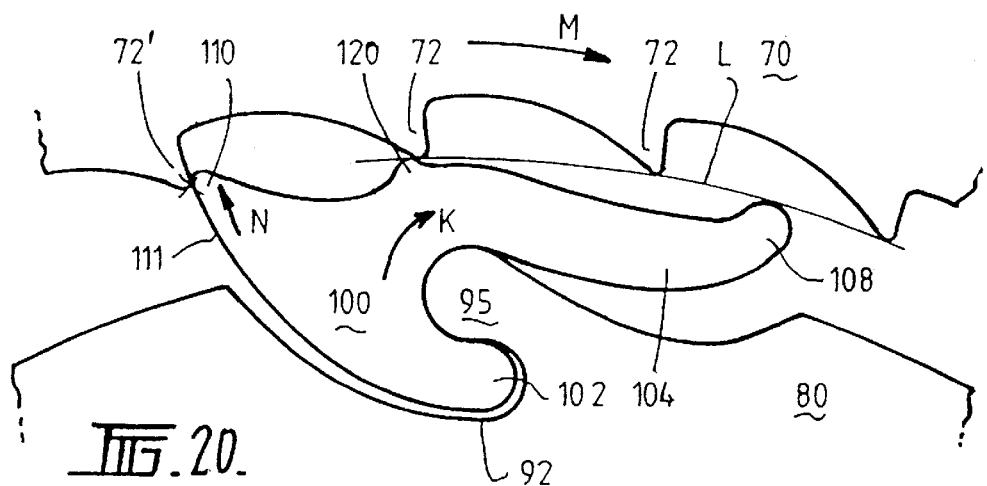

Rotation of the outer ring 70 in the opposite direction as shown by arrow M in FIG. 19 will cause drive to be transmitted to the inner member 80. Tooth 72 in FIG. 19 engages drive projection 120 which, as shown in FIG. 20, causes the engagement member 100 to rock in the direction of arrow K on retaining boss 95 once again so the tooth 110 is moved upwardly as shown by arrow N into the path of tooth 72' (shown in FIG. 20).

Figure 21:
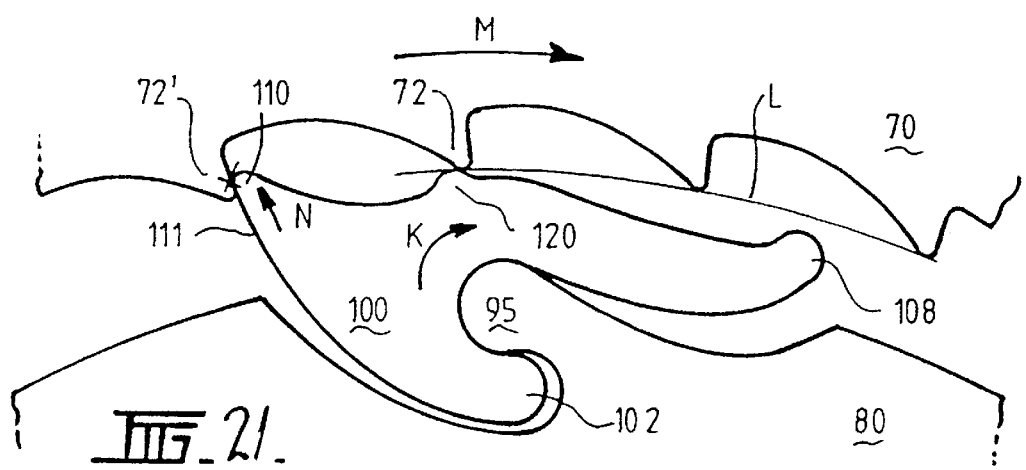
Figure 22:
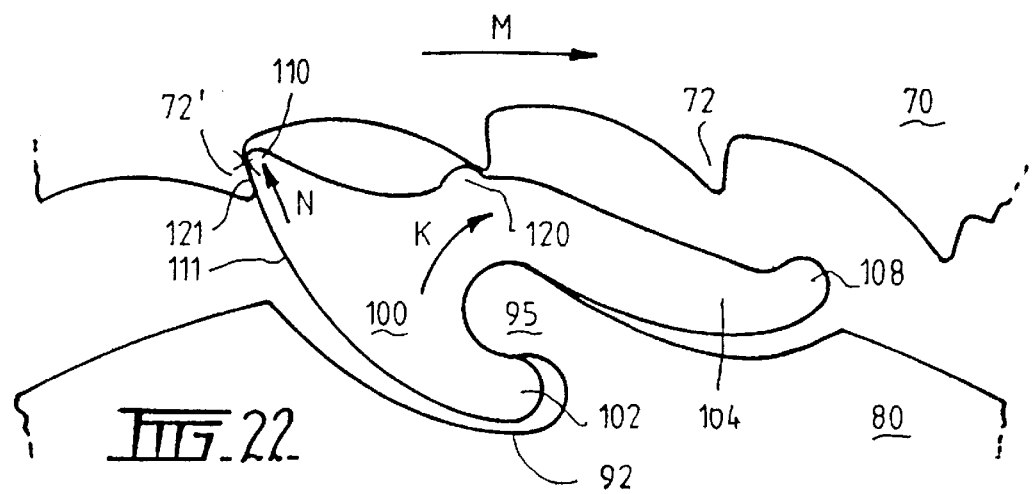

FIGS. 21 and 22 show the tooth 72 moving over the drive projection 120 and continued movement of the tooth 110 by sliding movement on the surface 121 of the tooth 72' into the path of tooth 72'. Continued rotation in the direction of arrow M shown in FIG. 22 will cause drive to be transmitted from the ring 70 via the contact between surface 121 of tooth 72' and tooth surface 111 of tooth 110 so that drive is transmitted to the engagement member 100 also in the direction of arrow M to in turn transmit drive to the inner member 80 to rotate the inner member 80 also in the direction of arrow M. Thus, in the position shown in FIG. 22, the engagement member 100 has been rocked into engagement with one of the teeth 72 of the ring 70 and is held in that position by the contact and rotation of the ring 70 so that drive is transmitted via the engaging member 100 through to the inner member 80 to rotate the inner member.

Figure 7:
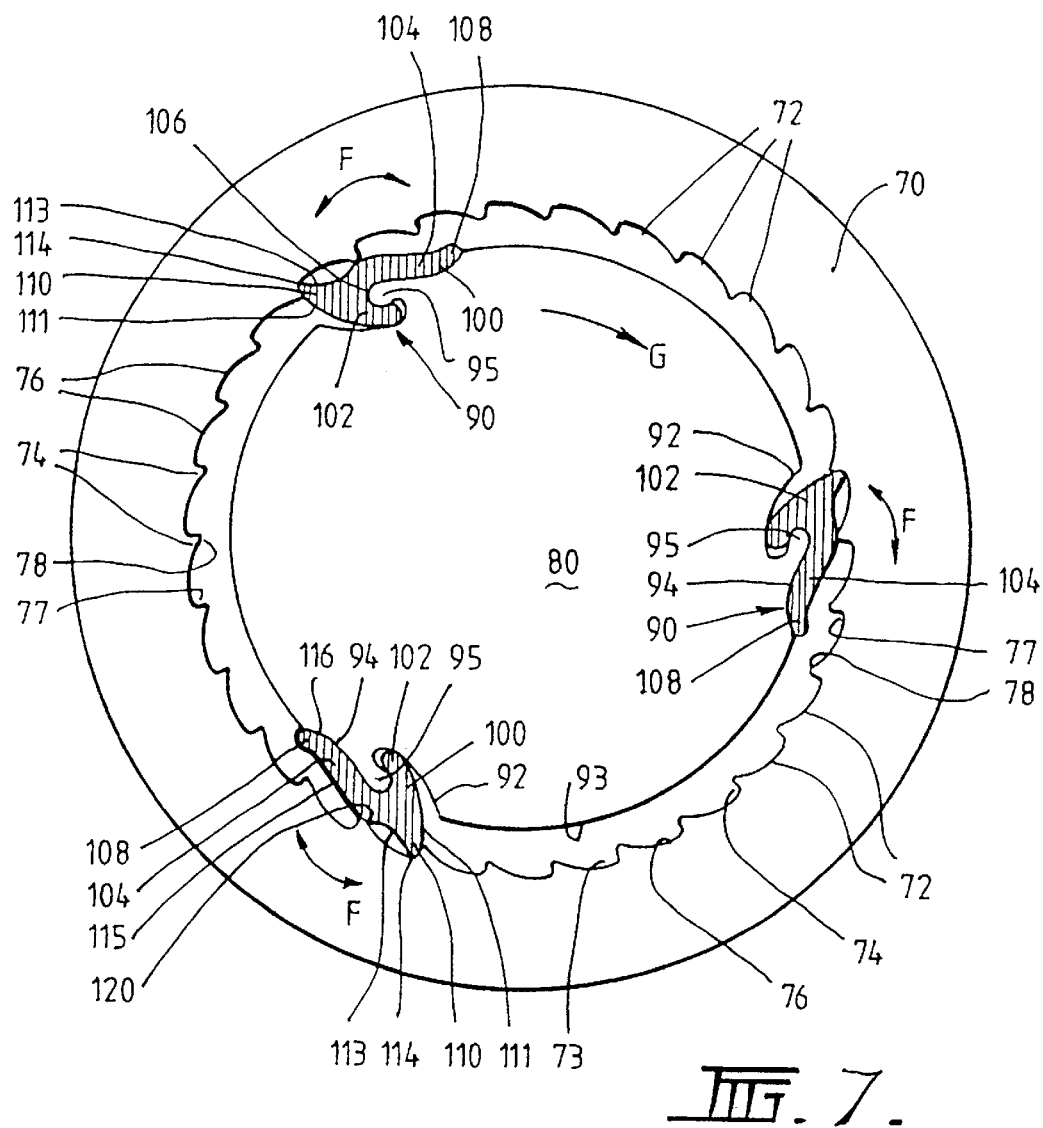
FIG. 7 is a view of a further embodiment of the invention.
Figure 8:
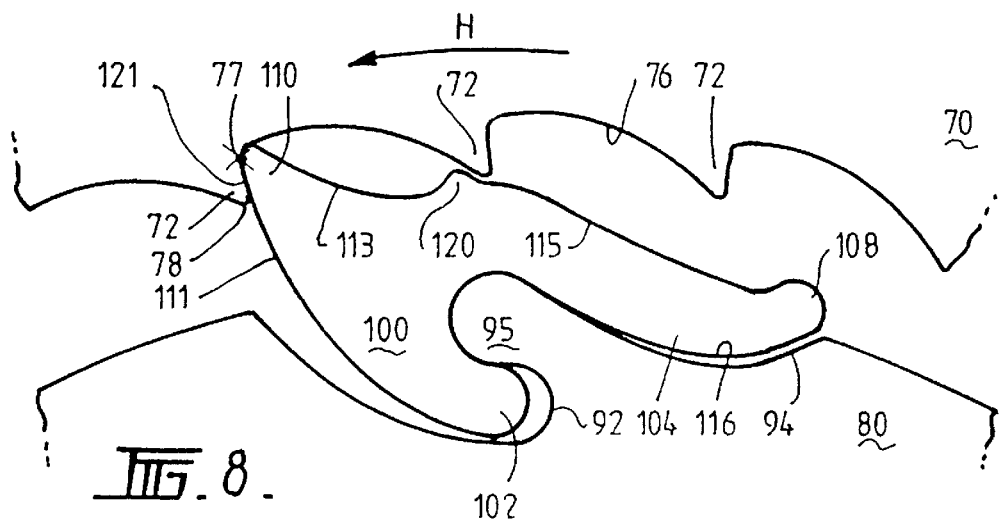

As shown in FIG. 7, the ratchet includes three engaging members 100 and three corresponding retaining bosses 95. However, the number of engaging members 100 is arbitrary and additional engaging members could be arranged around the circumference of the inner member 80 if desired.

The advantage of the preferred embodiment of FIG. 7 is that the ratchet can operate at very high speeds and also can be stopped very accurately and with very small amounts of movement.

Figure 23:
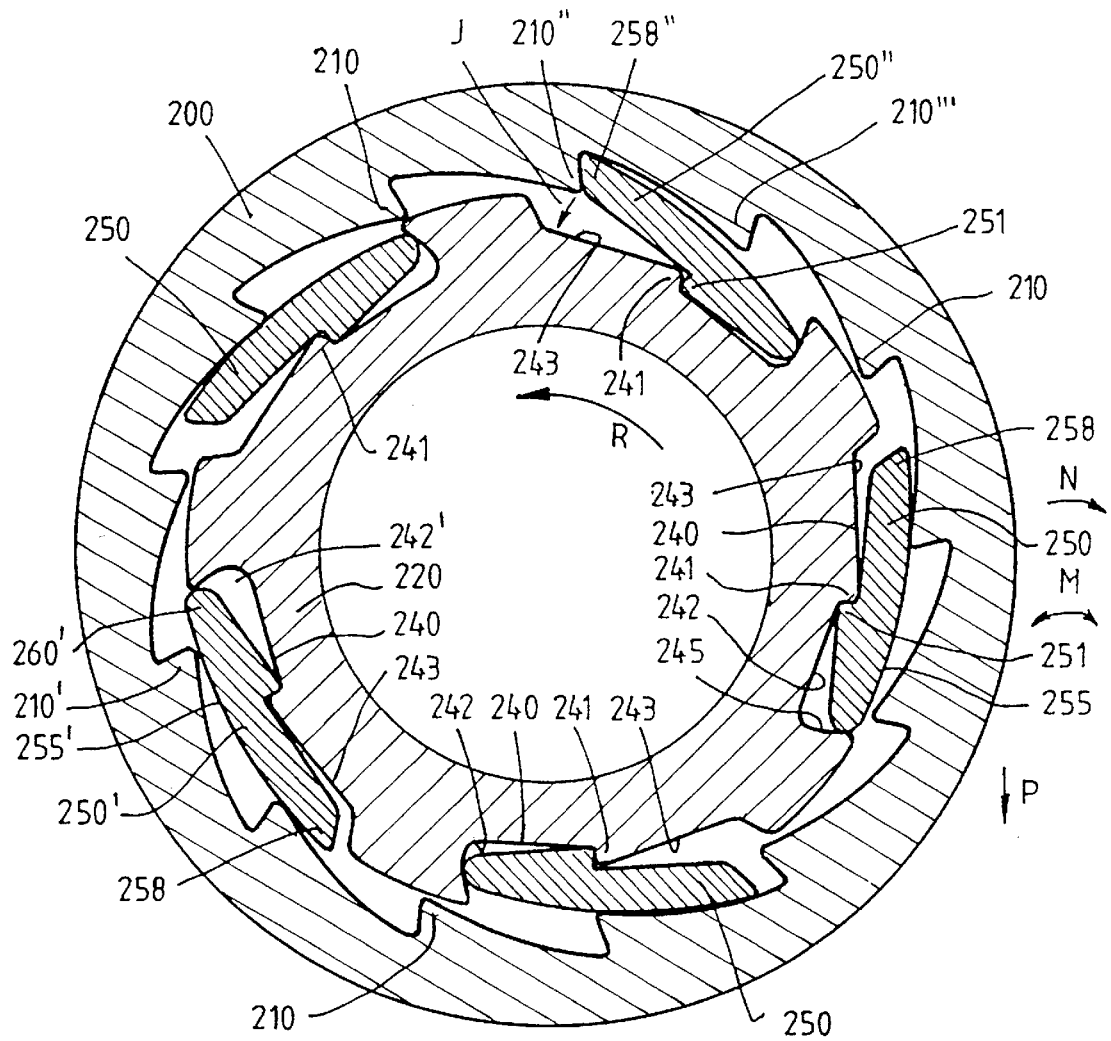
FIG. 23 is a view of a further embodiment of the invention.

FIG. 23 is an embodiment similar to that shown in FIGS. 7 to 22 which has further advantages for high speed operation. In particular, this embodiment provides for relatively low activity of the engaging member (that is relatively low movement of the engaging member) between engaged and disengaged positions which assists in smooth high speed operation.

With reference to FIG. 23, an outer ring 200 is provided with teeth 210 and an inner ring 220 has cutouts 240. The cutouts 240 include a curved boss or step 241 and a rear generally deep recess 242 and a more shallow front recess 243 on opposite sides of the step 241. An engaging member 250 is mounted on the step 241 by a step or shoulder 251 formed on the member 250. The engaging member 250 is therefore able to rock back and forward in the direction of arrow M in FIG. 23 on the step 241.

The recessed portion 242 has a rear wall 245 which limits movement of the engagement member 250 in the direction of arrow P in FIG. 23 and movement in the opposite direction to arrow P is prevented by engagement between the step 251 and the shoulder 241.

When the inner member 220 is rotated in the direction of arrow R in FIG. 23, one of the teeth 210 will engage the outermost surface 255 of the member 250 generally towards the rear of the member 250 and cause the member 250 to rock on shoulder 241 in the direction of arrow N in FIG. 23 to pull engagement tooth 258 of the member 250 radially outwardly. The member marked 250' in FIG. 23 and the tooth marked 210' show this engagement between the surface 255' and the tooth 210' which commences rocking movement of the member 250 to bring the engagement tooth 258 up into position where it will engage with one of the teeth 210. Continued movement of the inner ring 220 will force rear end 260' of the member 250' down into recess portion 242'. This position is shown by the engagement member labelled 250" in FIG. 23. In this position, the engagement member 250" is in position for engagement with tooth 210" so that when the tooth 258" engages tooth 210" the tooth 258" moves up into full engagement with the tooth 210". In this embodiment of the invention, only one of the engagement members 250 engages the tooth 210 and transmits drive to the outer ring 200. If the inner ring 220 is rotated in the direction opposite arrow R, the engagement member 250 is pulled out of engagement with the tooth 210" and is rocked by tooth 210"' in the direction of arrow J in FIG. 23 so that the ring 220 can simply rotate freely relative to the ring 200.

In this embodiment, the drive portion formed by the smooth surface 255 of the member 250 results in a relatively small amount of movement of the engagement member 250 between the engaged position and the disengaged position which further assists in high speed movement. Also, the engagement between the tooth 210 and the drive surface 255 does not force the member 250 completely into engagement with the tooth but rather positions the engagement tooth 258 so it will contact the tooth 210 and by virtue of the engagement, the tooth 258 will be forced completely into the tooth 210. This contrasts with the previous embodiment where the drive projection 120 cause the engagement tooth on the engagement member to be fully inserted into the tooth on the outer ring.

FIGS. 24 to 27 show an embodiment which is similar to FIGS. 1 to 5 but which also include a drive surface for assisting movement of the ratchet into the engaged position.

Figure 24:
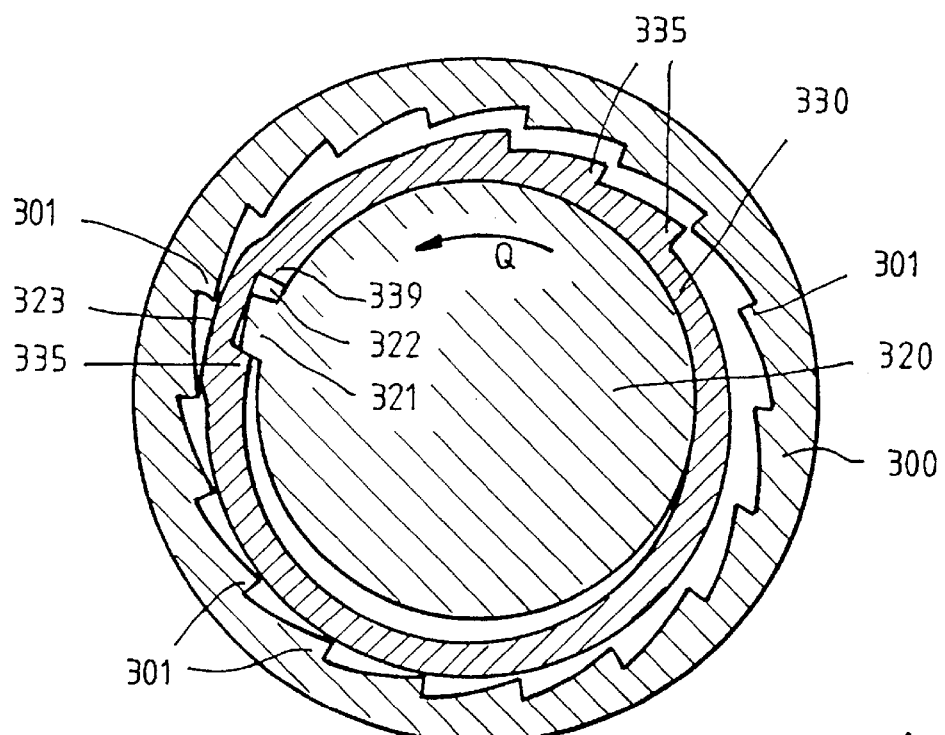
FIG. 24 is a cross-sectional view of a still further embodiment of the invention.

With reference to FIG. 24, an outer ring 300 is provided with teeth 301. An inner ring 320 may be formed integral or as part of a shaft and has a cam lug 321 on one surface. A loose fitting engagement ring 330 is provided on the ring 320 and includes a recess 322 for receiving the cam 321. The ring 330 in the vicinity of the recess 322 includes a drive surface 323 which projects radially outwardly with respect to the remainder of the ring 330. The ring 330 is generally circular in configuration but slightly flattened on one side in the vicinity of the drive surface 323. When the inner ring 320 is rotated in the direction of arrow Q, the mechanism is able to freewheel with the cam 321 contacting end surface 335 of the recess 322 to move the ring 330 also in the direction of arrow Q so that the drive surface 321 simply rides over the teeth 301.

The inner ring 330 has a number of teeth 335 which, in the position shown in FIG. 24 when the ratchet mechanism is freewheeling, are held generally clear of the teeth 301 or simply ride over the teeth 301.

Figure 25:
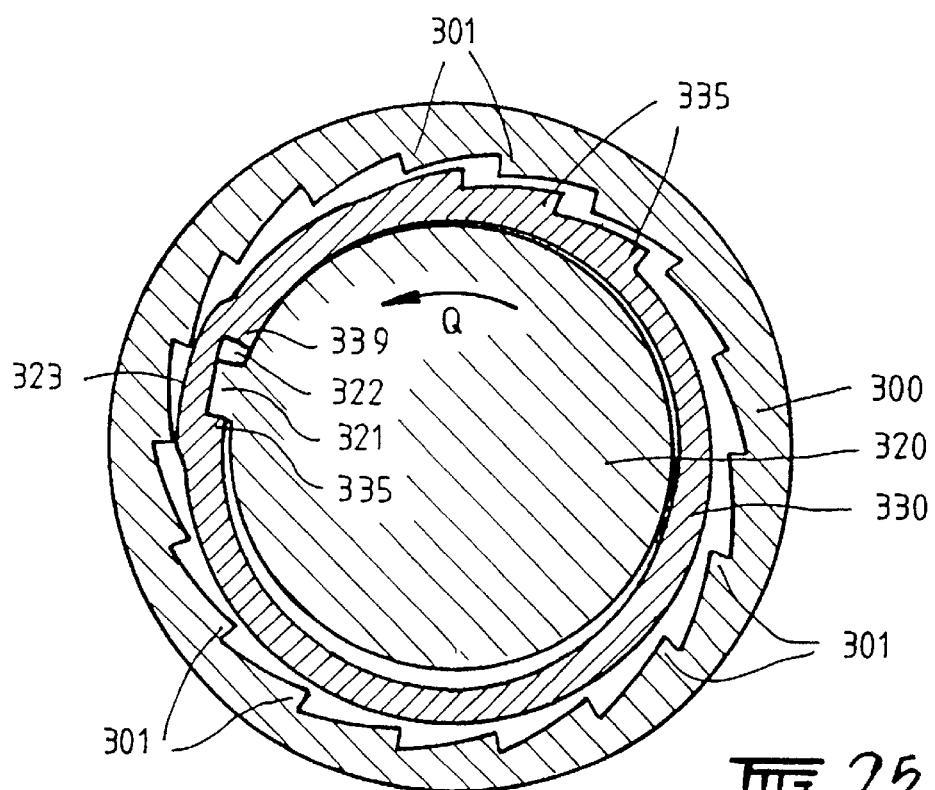
FIG. 25 shows the embodiment of FIG. 24 in a slightly different position.

FIG. 25 shows a view similar to FIG. 24 with the drive surface 323 clearly riding over the teeth 301 and with the teeth 335 clear of the teeth 301.

Figure 26:
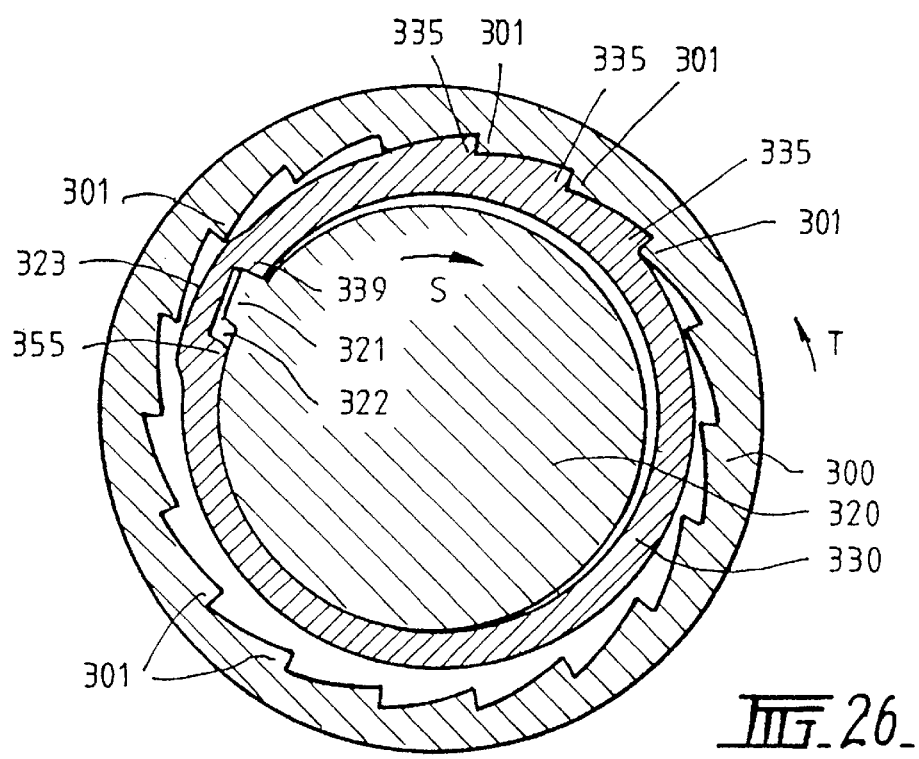
FIG. 26 is a view of the embodiment of FIG. 24 in a driving or locked position.
Figure 27:
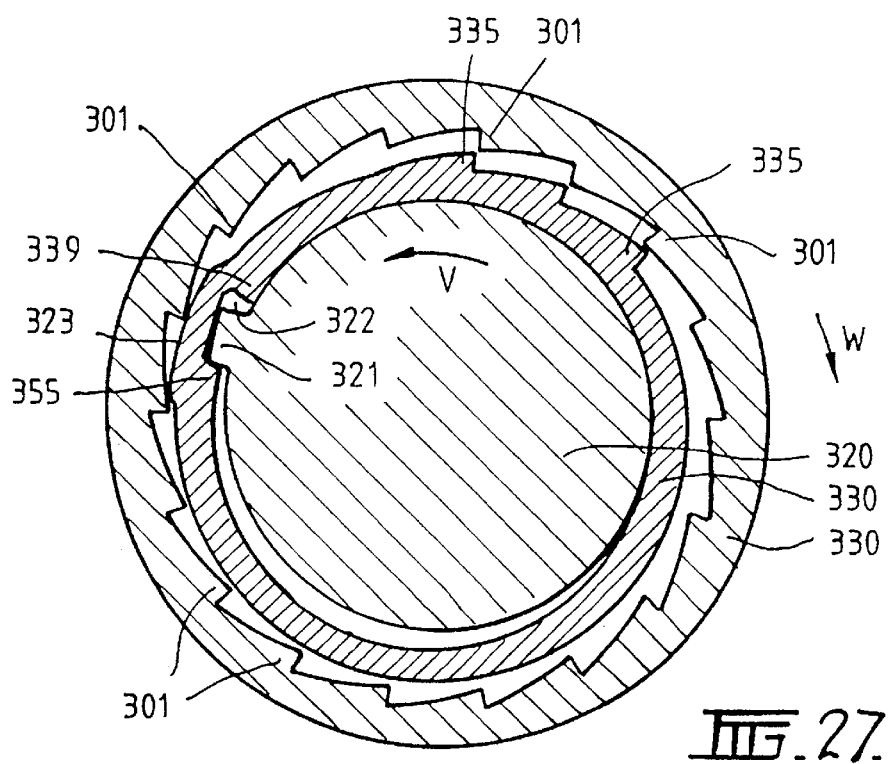
FIG. 27 is a view of the embodiment of FIG. 24 in a released position.

When it is desired to engage the ratchet, the ring 320 is rotated in the direction of arrow S in FIG. 26. This causes the cam 321 to move to the opposite end of the recess 322 so it engages end surface 339 of the recess 322. Continued rotation of the inner ring 320 in the direction of arrow S will cause the ring to commence rotating also in the direction of arrow S. As the ring rotates in the direction of arrow S, the drive surface 323 will contact the teeth 301 which will tend to cause the ring 330 to lift or rotate slightly in the direction of arrow T in FIG. 26 which pulls the teeth 335 of the ring 330 into engagement with the teeth 301 of the outer ring 330. Thus, positive engagement takes place and drive is transmitted from the inner ring 320 via the engagement ring 330 to the outer ring 301. If rotation is reversed as shown by arrow V in FIG. 27, the cam 321 moves to the opposite end of the recess 322 and the engagement ring 330 is rotated also in the direction of arrow V. Engagement of the drive surface 323 with the teeth 301 will tend to pull the ring 330 downwardly slightly in the direction of arrow W in FIG. 27 so that the teeth 335 disengage from the teeth 301 so the ratchet can simply freewheel in the reverse direction.

Since modifications within the spirit and scope of the invention may readily be effected by persons skilled within the art, it is to be understood that this invention is not limited to the particular embodiment described by way of example hereinabove.

What is claimed is:

1. A ratchet mechanism, including:
   an outer member having a plurality of teeth on an inner circumferential surface;
   an inner member having a retaining portion, the retaining portion comprising an arcuate groove in the inner member and an arcuate scallop adjacent the groove which define a retaining boss on the inner member;
   an engaging member mounted for rocking movement on the retaining portion of the inner member;
   at least one tooth on the engaging member;
   a drive portion on the engaging member; and
   wherein upon rotation of the outer member in one direction, the teeth of the outer member engage the drive portion of the engaging member to rock the engaging portion relative to the retaining member so that the at least one tooth of the engaging portion is disengaged from the teeth of the outer member to allow the outer member and inner member to rotate relative to one another, and upon rotation in the opposite direction, the teeth of the outer member engage the drive portion to rock the engaging member so as to cause the at least one tooth of the engaging portion to engage with at least one of the teeth of the outer member so that the drive is transmitted form the outer member via the engaging member to the inner member.

2. The ratchet mechanism of claim 1, wherein the engaging member has a retaining recess for engaging the retaining boss so as to locate the engaging member on the retaining boss for rotational movement with the inner member and for the rocking movement on the retaining boss relative to the inner member.

3. The ratchet mechanism of claim 1, wherein the drive portion comprises a projecting hump on the engaging portion.

4. The ratchet mechanism of claim 1, wherein the engaging portion has a tail having an abutment section for engagement with the teeth of the outer ring to facilitate rocking movement of the engaging member.

5. A ratchet mechanism, comprising;
   a rotatable outer member;
   a rotatable inner member, the inner member being rotatable relative to the outer member so that input drive can be supplied to one of the inner member and outer member and output drive selectively taken from the other of the inner member and outer member;

a plurality of teeth on one of the inner member and outer member;

at least one engaging member on the other of the inner member and outer member, the engaging member having an engaging tooth, the engaging member being carried by the said other of the inner and outer member so that the engaging member can rock back and forth on the said other of the inner and outer member during relative rotation between the said inner and outer members;

the engaging member having an actuating surface which has a drive part, a first part and a second part, for contact with the said plurality of teeth during relative rotation between the inner and outer members;

whereupon rotation of the inner member relative to the outer member in a first direction causes rocking movement of the engaging member by contact of one of the plurality of teeth with the drive part of the actuating surface so the engaging member is rocked to drive said engaging tooth into alignment with the plurality of teeth so the engaging tooth will engage one of the plurality of teeth to transmit drive between the inner member and outer member; and whereupon when the outer member is rotated relative to the inner member in a direction opposite the first direction the first part of the actuating surface is engaged by one of said plurality of teeth to cause the engaging member to rock so that the engaging tooth is drawn away from alignment with the said plurality of teeth and whereupon the second part of the engaging surface is rocked into alignment with the plurality of teeth, and one of said plurality of teeth contacts the second part upon continued relative rotation between the inner member and the outer member so as to again rock the engaging member to return the engaging tooth to a position in alignment with the said plurality of teeth, said rocking motion of the engaging member continuing as relative rotation in the opposite direction occurs between the inner member and the outer member by virtue of the plurality of teeth sequentially engaging the first and second parts of the engaging surface so that relative rotation can take place between the inner member and the outer member without drive being transmitted between the inner member and the outer member.

6. The ratchet mechanism of claim 5 wherein the at least one engaging member comprises a plurality of engaging elements mounted for rocking movement on bosses, the drive part and the first part of the engaging surface of each engaging element being respectively opposite sides of a drive hump, and the second part of the engaging surface of each engaging element being provided on a tail of the engaging element;

whereupon rotation in the said opposite direction, one of the plurality of teeth contacts one side of the drive hump to rock the engaging element so that the engaging tooth is moved out of alignment with the said plurality of teeth and whereafter another of the plurality of teeth engages the tail to rock the element to return the engaging tooth to a position in alignment with the plurality of teeth, said rocking motion continuing to occur during relative rotation of the inner and outer members in said opposite direction; and whereupon rotation in the first direction causes one of the plurality of teeth to contact the other side of the drive hump to cause the engaging element to rock so that the engaging tooth is moved into alignment with the plurality of teeth for locking with the plurality of teeth.

7. The mechanism according to claim 6 wherein the said plurality of teeth are provided on an inner circumferential portion of the outer member and the at least one engagement member is mounted on the inner member.

8. The ratchet mechanism of claim 5 wherein the at least one engaging member comprises a plurality of engaging elements mounted on the inner member, the inner member having a shoulder on which the mounting elements locate, each shoulder being defined between a relatively shallow cut out and a deeper recess, the deeper recess having an end wall for preventing circumferential movement of the engaging element relative to the inner member, the engaging surface being a relatively smooth surface on the engaging element;

the drive part of the engaging surface being at one end of the element remote from the engaging tooth so that when at least one of the plurality of teeth contacts the drive part the engaging element is rocked on the shoulder into a position in which the engaging tooth is in alignment with the said plurality of teeth, so that upon rotation in the first direction one of the plurality of teeth can engage the engaging tooth;

the first part of the engaging surface being a portion of the engaging surface adjacent the engaging tooth, so that when the inner member rotates relative to the outer member in the opposite direction, one of the plurality of teeth causes the first part to rock on the shoulder to move the engaging tooth out of alignment with the said plurality of teeth, and second part of the engaging surface being co-incident with the drive part so that when the engagement tooth is moved out of alignment with the plurality of teeth the second part moves into alignment with the plurality of teeth so the second part is contacted by another of the plurality of teeth to rock the engagement element so that the engaging tooth moves back into alignment with the plurality of teeth, the rocking movement continuing as relative rotation occurs in the opposite direction so that the inner member can rotate relative to the outer member without the transmission of drive between the inner member and the outer member.

9. A ratchet mechanism, comprising;

a rotatable outer member;

a rotatable inner member, the inner member being rotatable relative to the outer member so that input drive can be supplied to one of the inner member and outer member and output drive selectively taken from the other of the inner member and outer member;

a plurality of teeth on one of the inner member and outer member;

at least one engaging member on the other of the inner member and outer member, the engaging member having an engaging tooth, the engaging member being carried by the said other of the inner and outer member so that the engaging member can rock back and forth on the said other of the inner and outer member during relative rotation between the said inner and outer members;

a driving portion for causing the engaging member to rock on the said other of the inner and outer member upon relative rotation of the inner member with respect to the outer member in a first direction so that the engaging tooth is moved into alignment with the plurality of teeth so that the engaging tooth can engage with one of the plurality of teeth to transmit drive between the inner member and the outer member; and the drive portion, upon rotation of the inner member relative to the outer member in a direction opposite to the first direction, causes the engaging member to rock on the other of the inner and outer member so as to first move the engaging tooth out of alignment with the plurality of teeth so that one of the plurality of teeth can move over the engaging tooth and after the said one of the plurality of teeth has moved over the engaging tooth, the drive portion rocks the engaging member so that the said engaging tooth is moved into alignment with the plurality of teeth between two of the said plurality of teeth, said rocking movement continuing upon actuation of either or both of the inner or outer member to cause the relative rotation in the opposite direction so that the engaging member rocks into and out of alignment with the plurality of teeth but without the transmission of any drive between the inner member and the outer member, but if movement of either of the inner and outer member causes rotation to again occur in the said first direction, the drive portion rocks the engaging member to locate the engaging tooth in alignment with the plurality of teeth so one of the plurality of teeth can immediately engage the engaging tooth to lock the inner member to the outer member.

10. The ratchet according to claim 9 wherein the drive portion comprises a surface portion of the engaging member which is engaged by the plurality of teeth during relative rotation of the inner member and outer member to cause the rocking movement of the engaging member.

11. The ratchet mechanism according to claim 10 wherein the engaging member has a tail and the surface of the engaging member has a drive part, a first part and a second part and whereupon the rocking movement of the engaging member occurs upon relative rotation in the opposite direction by one of the said plurality of teeth engaging the first part to cause the engaging tooth to move out of alignment with the plurality of teeth and an adjacent one of the plurality of teeth engaging the second part on the tail to rock the engaging member so that the engaging tooth is again moved into alignment with the plurality of teeth, and rotation in the first direction cause one of the plurality of teeth to engage the drive part to rock the engaging element so the engaging tooth is moved into alignment with the plurality of teeth.

12. The ratchet mechanism according to claim 11 wherein the drive part of the engaging surface is formed at an end of the engaging surface remote from the engaging tooth, the first part is part of the engaging surface adjacent the engaging tooth and the second part is co-incident with the drive part.

13. The ratchet mechanism according to claim 9 wherein the drive part and first part of the surface are opposite surfaces of a hump formed on the engaging member and the second part of the surface is arranged on a tail of the engaging element remote from the engaging tooth.

* * * * *